United States Patent [19]
Imbrie et al.

[11] Patent Number: 5,400,514
[45] Date of Patent: Mar. 28, 1995

[54] LASER INSTRUMENT FOR TRACING REFERENCE LINES AND OTHER GEOMETRIC FIGURES

[75] Inventors: Gary J. Imbrie, Beaverton; Robert H. Niemeyer, III, Tigard; M. Mark Walker, Hillsboro, all of Oreg.

[73] Assignee: Economy Laser, Inc., Hillsboro, Oreg.

[21] Appl. No.: 200,183

[22] Filed: Feb. 22, 1994

[51] Int. Cl.⁶ .......................................... C01C 15/02
[52] U.S. Cl. ................................ 33/286; 33/290; 33/291; 33/DIG. 21; 356/138; 353/43
[58] Field of Search ............... 33/282, 285, 286, 290, 33/291, DIG. 21; 356/138, 399, 400; 353/46

[56] References Cited

U.S. PATENT DOCUMENTS

| | | | |
|---|---|---|---|
| 3,426,144 | 2/1969 | Roth . | |
| 3,462,845 | 8/1969 | Matthews | 33/286 |
| 3,471,234 | 10/1969 | Studebaker | 33/285 |
| 3,579,846 | 5/1971 | Catherin . | |
| 3,724,953 | 4/1973 | Johnston, Jr. | 33/DIG. 21 |
| 3,767,299 | 10/1973 | Fisher | 353/46 |
| 3,771,876 | 11/1973 | Ljungdahl et al. | 33/291 |
| 3,822,943 | 7/1974 | Mason | 356/138 |
| 4,679,937 | 7/1987 | Cain et al. | 356/138 |
| 4,751,782 | 6/1988 | Ammann | 33/291 |
| 4,767,208 | 8/1988 | Cain et al. | 356/138 |
| 4,971,440 | 11/1990 | Winckler | 356/138 |
| 4,973,158 | 11/1990 | Marsh | 33/291 |
| 5,085,525 | 2/1992 | Bartosiak et al. . | |

FOREIGN PATENT DOCUMENTS

2001414  7/1971  Germany .

*Primary Examiner*—William A. Cuchlinski, Jr.
*Assistant Examiner*—G. Bradley Bennett
*Attorney, Agent, or Firm*—Klarquist Sparkman Campbell Leigh & Whinston

[57] ABSTRACT

Various devices are disclosed for projecting a beam of coherent collimated light at a surface for use as reference lines and planes. The devices are also useful for projecting tracings of light in any of various geometric patterns. The devices comprise a pointer unit containing a light source, such as a laser diode. The light source is mounted so as to undergo periodic reciprocating motion in least one dimension, as imparted by any of various possible mechanisms. Combinations of such motions in two dimensions allows production of an infinite variety of geometric tracings. The pointer unit can be detachably mounted perpendicularly to a rotatable shaft provided by a base portion, or used separately as a level or hand-held pointer.

21 Claims, 5 Drawing Sheets

LASER INSTRUMENT FOR TRACING REFERENCE LINES AND OTHER GEOMETRIC FIGURES

FIELD OF THE INVENTION

This invention pertains to light-projecting instruments, particularly such instruments useful for pointing, indicating, and fiducial purposes.

BACKGROUND OF THE INVENTION

In the construction industry, narrow beams of collimated light in the form of laser beams are used in instruments termed "laser-leveling devices" for establishing reference lines and planes such as for accurate placement and alignment of building floors, ceilings, and walls.

Methods for producing reference lines and planes using laser beams have varied, but the preferred method has been to radially sweep a laser beam by use of an optical prism, an optical "cone," or other type of optical beam deflector that can be rotated independently of a stationary laser source. Because of their sophistication, such deflectors are typically expensive. Representative prior-art devices for such purposes are disclosed in U.S. Pat. Nos. 3,462,845 to Matthews, 3,579,846 to Catherin, and 3,822,943 to Mason.

The establishment and maintenance of an accurately horizontal or vertical swept laser beam has been the subject of much research and development. In many instances, any of various "auto-leveling" components are employed, as disclosed in U.S. Pat. Nos.: 4,767,208; 3,426,144; 3,471,234; and 4,679,937. Unfortunately, conventional auto-leveling, as disclosed in the foregoing references, requires optical components made with very small tolerances, electronic sensors, and/or extensive use of sophisticated dampening devices. These components, together with expensive beam deflectors, render many types of laser-leveling devices too costly for many small contractors and builders.

U.S. Pat. No. 4,973,158 to Marsh discloses a laser-leveling device comprising a laser diode mounted to a rotatable shaft. Power is supplied to the laser diode from a stationary source. Thus, this apparatus requires an electric "slip ring" to transfer power from the stationary source to the rotating laser. Unfortunately, slip rings are inherently unreliable. Another disadvantage with this apparatus is that the laser source cannot be detached from the shaft for use as a laser level, for producing a stationary laser line, or for hand-held use as a pointer or the like.

Yet another disadvantage of prior-art laser devices of the type used in construction and related arts is that such devices are limited to producing substantially straight lines, not tracings of other geometric profiles.

Thus, there is a need for a laser instrument for tracing reference lines that has sufficient accuracy and reliability for use by small contractors and do-it-yourself homeowners, but is low in cost. There is also a need for such a system having greater utilitarian flexibility for a variety of uses such as for use as a hand-held laser pointer and generator of projected tracings of laser light in a variety of geometric patterns.

SUMMARY OF THE INVENTION

According to one aspect of the present invention, an apparatus is provided for producing and directing a beam of coherent collimated light (such as a laser beam) to impinge on a surface so as to produce a tracing of light on the surface. The apparatus comprises a shaft having a fixed longitudinal axis, wherein the shaft is rotatable about the axis; a "pointer unit" including a source of coherent collimated light; a motor operably coupled to the shaft so as to rotate the shaft about the axis; and a mechanism in the pointer unit serving to impart a periodic reciprocating motion (in at least one dimension) to the light source independently of any motion of the pointer unit. The pointer unit is detachably mountable to the shaft so as to produce, whenever the unit is mounted to the shaft, a light beam oriented substantially perpendicularly to the axis of the shaft. Thus, as the motor rotates the shaft, the pointer unit produces a swept light beam that can be used to define a reference plane.

Various possible mechanisms according to the present invention for moving the light source in a periodic reciprocating manner independently of any motion of the pointer unit are particularly suitable for producing, using the pointer unit, tracings of light in any of various geometric patterns on a surface. Such a mechanism, preferably located in a pointer-unit housing, is generally comprised of a first mounting member, intended to be rigid and stationary relative to the housing. The mechanism also comprises a second mounting member, to which the light source is mounted, attached to the first mounting member in a manner allowing the second mounting member to move, relative to the first mounting member, in a periodic reciprocating manner. The second mounting member can be mounted to the first mounting member via a hinge (and employing a bias such as a spring situated between the first and second mounting members) or by incorporating a springably flexible characteristic to the second mounting member.

In a preferred embodiment useful for imparting a periodic reciprocating motion of the second mounting member in a first dimension, an electromagnetic coil is mounted on the first mounting member and a ferromagnetic mass is mounted on the second mounting member. Thus, whenever the coil is energized, the ferromagnetic mass is attracted to the coil (thereby moving the second mounting member toward the first mounting member); whenever the coil is deenergized, the second mounting member is allowed to move away from the first mounting member. Thus, rapid energizations and de-energizations of the coil can impart a rapid, periodic, reciprocating motion to the light source relative to the first mounting member.

Such mechanisms for imparting a periodic reciprocating motion to the light source in a first dimension can be embellished to also permit similar motions of the light source in a second dimension preferably perpendicular to the first dimension. Any of a virtually infinite variety of combinations of periodic reciprocating motions of the light source in both dimensions can produce a corresponding infinite variety of geometric tracings of light from the light source on a surface. Such tracings include alphanumeric characters.

According to another aspect of the present invention, the pointer unit can be used as a hand-held laser pointer. Alternatively, the pointer unit can be attached to a base portion that provides the rotatable shaft and the motor for rotating the shaft, thereby providing an instrument capable of producing laser-traced reference lines and planes.

According to another aspect of the present invention, the pointer unit can comprise a receptacle, preferably mounted to the housing, adapted for releasably mounting the pointer unit to a rotatable shaft, such as a rotatable shaft provided by a base portion. The receptacle defines an orifice adapted to receive an end of the shaft. The end of the shaft is urged against two fixed parallel pins that, in the orifice, are oriented precisely parallel to the shaft axis whenever the pointer unit is attached to the shaft. A spring-biased ball in the receptacle that engages an annular detent in the end of the shaft provides a preferred means of releasably securing the receptacle to the end of the shaft.

According to yet another aspect of the present invention, one can adjust the orientation of the housing relative to the receptacle so as to accurately position the pointer unit exactly perpendicular to the shaft axis whenever the pointer unit is mounted to the shaft. According to a preferred embodiment of this feature, an elastomeric gasket is interposed between the receptacle and the pointer-unit housing, and the receptacle is secured to the housing by screws that can be differentially tightened relative to each other.

According to yet another aspect of the present invention, the pointer-unit housing comprises a body and a front cover, to which front cover the first mounting member is attached. An elastomeric gasket is interposed between the front cover and the body, and the front cover is secured to the body by screws that can be differentially tightened relative to each other. Thus, one can adjust the orientation of the light beam produced by the light source to be accurately perpendicular to the axis of the shaft.

The housing of the pointer unit can have any of various external configurations, including configurations suitable for comfortable holding in a person's hand.

A preferred light source is a laser diode or other compact laser source. However, since the present invention is not limited in scope by size other sources of coherent collimated light may be more suitable for certain uses.

DETAILED DESCRIPTION

Figure 1:
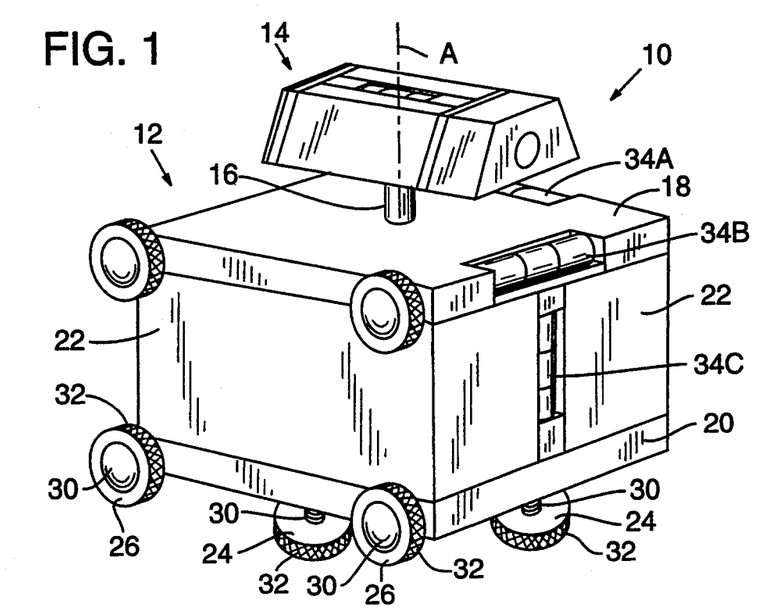
FIG. 1 is a perspective view of a preferred embodiment of a laser instrument according to the present invention useful for producing reference lines and planes, the instrument comprising a base portion and a detachable pointer unit.

As shown in FIG. 1, a preferred embodiment of an apparatus 10 according to the present invention useful for projecting reference lines and planes comprises a base portion 12 and a pointer unit 14. The pointer unit 14 is detachably mounted on a shaft 16 extending from the base portion 12. The base portion 14 includes a motor and associated components (not shown in FIG. 1 but discussed in detail below) operable to rotate the shaft 16 about its longitudinal axis A, thereby causing the pointer unit 14, when mounted to the shaft 16 as shown and whenever the motor is turned on, to rotate about the axis A and produce a radially swept light beam useful, for example, for projecting a reference plane.

The base portion 12 comprises a top panel 18, a bottom panel 20 and side panels 22, which together define a base housing. The base portion 12 is also provided with feet, a first set of feet 24 extending from the bottom panel 20 and a second set of feet 26 extending perpendicularly to the first set of feet 24, either from a side panel or from an edge of the top and bottom panels 18, 20, respectively, as shown. Each foot 24, 26 preferably comprises an elastomeric pad 28, a threaded shaft 30, and a radial edge 32 provided with a knurled surface (as shown), radial extensions, or analogous feature to facilitate manual turning of the feet for leveling of the base portion 12.

Figure 2:
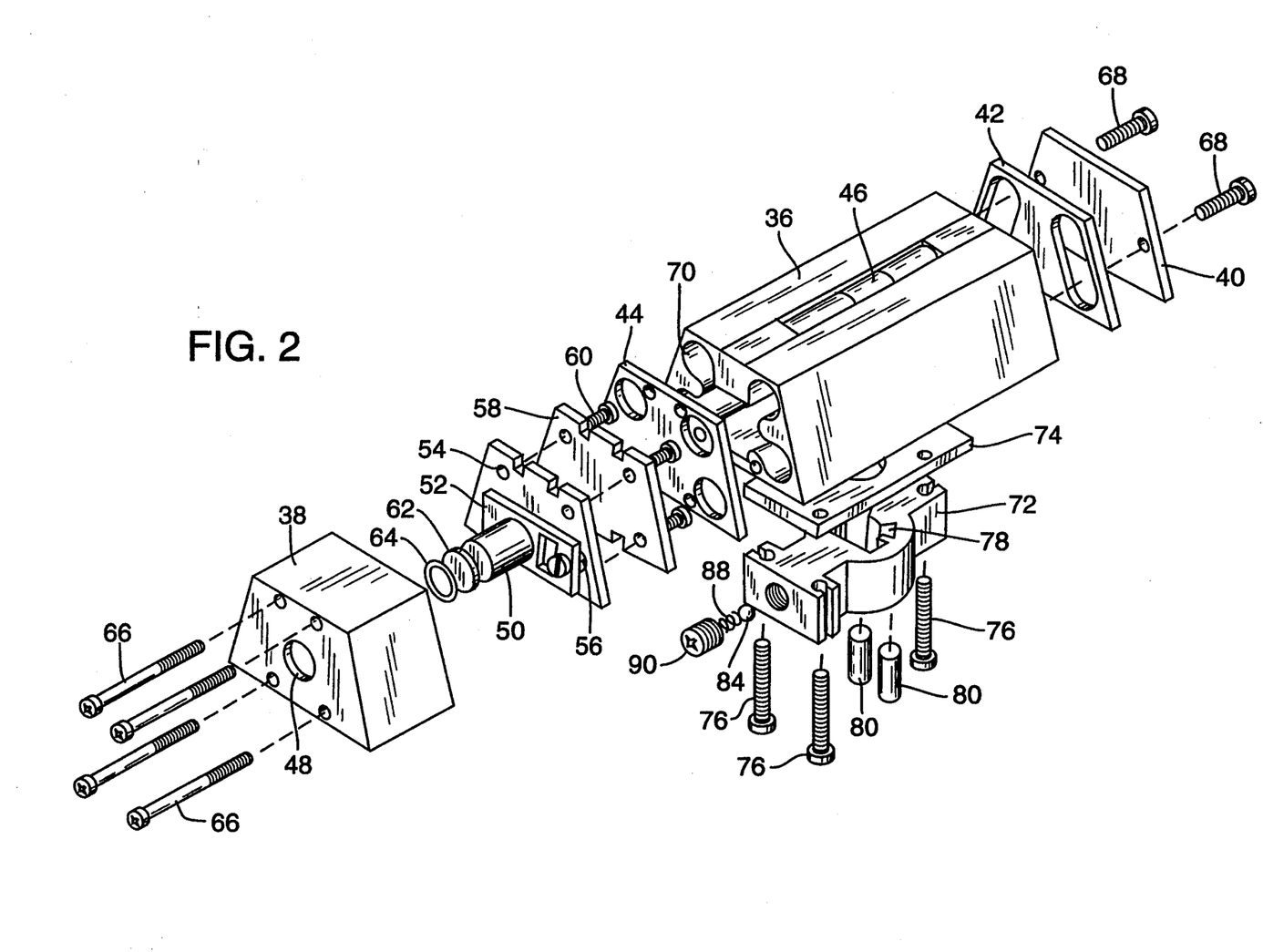
FIG. 2 is an isometric "exploded" diagram of the pointer unit shown in FIG. 1.

Conventional bubble levels 34A–34C (at least one in each orientation shown) are mounted to the base portion 12 to assist the user in leveling the base portion 12 whenever the base portion 12 is resting either on the first set of feet 24 or the second set of feet 26. During use, the base portion 12 is placed on any convenient surface but is particularly adapted to be placed or otherwise mounted on a horizontal reference support such as a tripod. With reference to FIG. 2, the pointer unit 14 comprises a body 36, a front cover 38, a rear cover 40, a rear gasket 42, a front gasket 44, and preferably at least one bubble level 46. The front cover 38 defines an orifice 48 through which is directed a light beam produced by a source of coherent collimated light, such as a laser diode or other compact laser source, situated inside the front cover 40, as described in detail below. Thus, rotating the shaft 16 (with the pointer unit 14 attached thereto) enables the pointer unit 14 to produce a radially swept light beam useful, for example, for projecting a reference plane. Keeping the pointer unit 14 mounted to the shaft 16 without rotating the shaft enables the pointer unit to produce a stationary light beam useful, for example, for projecting a reference line.

The body 36, front cover 38, and rear cover 40 collectively define a housing for containing the light source. The housing also preferably contains electronic circuitry and a power source for powering the light source, as discussed in detail below.

FIG. 2 is an exploded view of various components of the pointer unit 14. Shown are the pointer body 36, front cover 38, rear cover 40, rear gasket 42, front gasket 44, and bubble level 46. Also shown are a conventional laser diode 50 mounted on a sub-board 52. (If necessary, the laser diode 50 can be surrounded by a heat sink and provided with a suitable lens (not shown).)

The sub-board 52 is preferably mounted to a printed circuit board 54 via a standoff 56. (Various embodiments of the sub-board and alternative analogous structures to which the laser diode can be mounted are discussed in detail below.) Thus, the printed circuit board 54 and the sub-board 52 serve as representative first and second mounting members, respectively, for the laser diode 50. As an alternative to mounting the sub-board 52 to the circuit board 54 as shown, the sub-board 52 can be mounted to any rigid structure or panel serving as a first mounting member. In such an instance, the circuit board 54 can be located anywhere else in the pointer unit. Mounting the sub-board 52 to the circuit board 54 (i.e., having the circuit board 54 serve as the first mounting member) is preferred to minimize wiring and for economy of construction.

Figure 7:
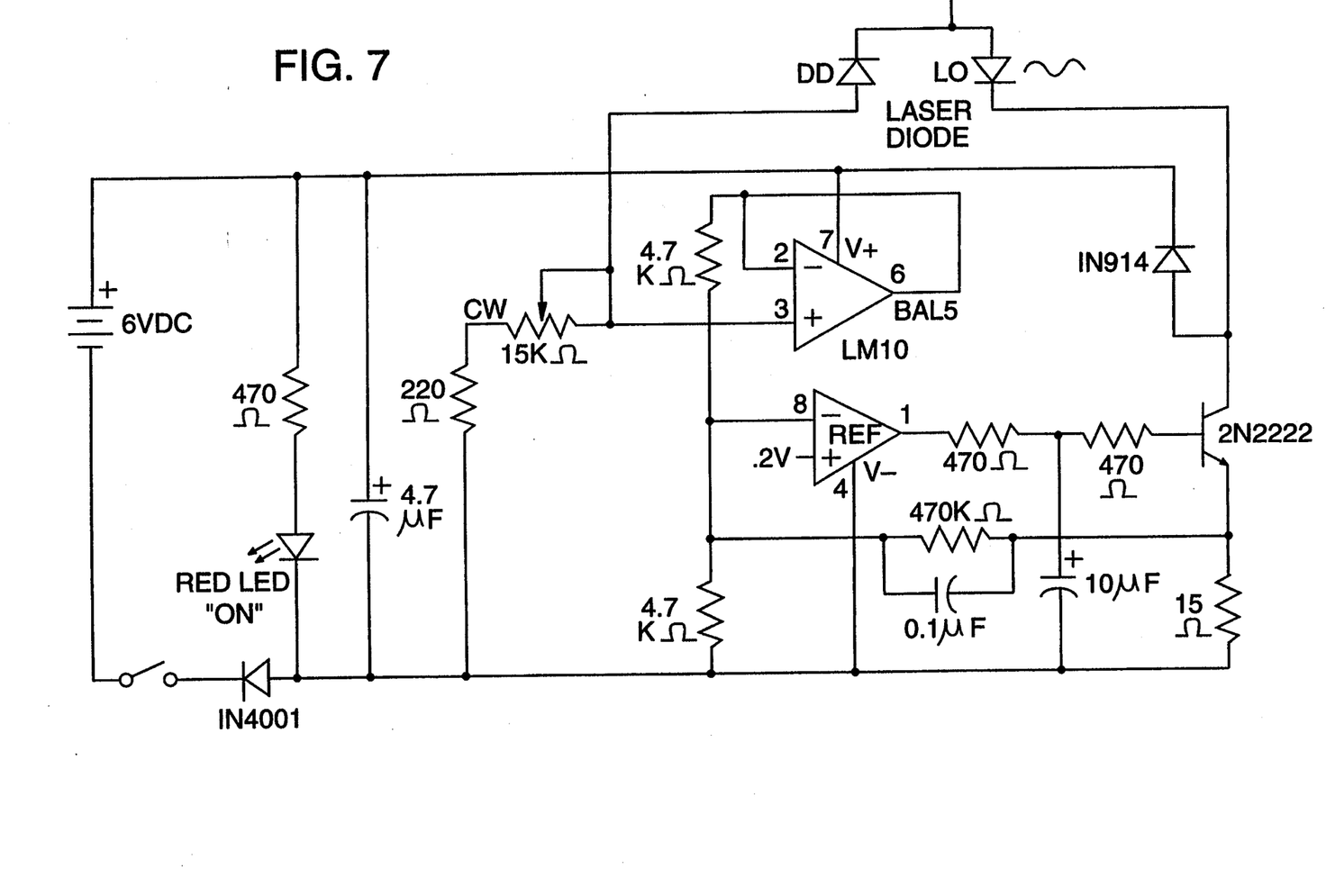
FIG. 7 is a schematic diagram of a representative embodiment of an electronic circuit for powering the laser diode.

The printed circuit board 54 preferably, but not necessarily, contains all the conventional electronic circuitry necessary to drive the laser diode 50 (representative schematic shown in FIG. 7). A backing plate 58 is placed superposedly behind the printed circuit board 54. The printed circuit board 54 and backing plate 58 are mounted inside the front cover 38 via screws 60.

Inside the orifice 48 defined by the front cover 38 are mounted a lens 62 and a seal 64 (such as an O-ring as shown). The lens 62 is preferably an optical flat but can be refractive if desired.

The front cover 38 is mounted to the pointer body 36 via screws 66, with the front gasket 44 interposed between the front cover 38 and the pointer body 36. The front gasket 44 is softly elastomeric to effectively seal the interior of the pointer unit 14 from the environment and to allow the screws 66 to be differentially tightened relative to each other. Selective tightening of the screws 66 allows one to adjust, over a small range, the orientation of the light beam produced by the laser diode 50 so as to be accurately perpendicular to the shaft 16, if required.

The rear cover 40 is mounted to the pointer body 36, with the rear gasket 42 situated therebetween via screws 68.

The pointer body 36 is preferably made of extruded aluminum or rigid polymer. Extrusion readily allows the pointer body 36 to be provided with interior channels 70 useful as bays in which to insert batteries (not shown) used to power the laser diode 50. Thus, the pointer unit 14 is provided with an integral power source.

The pointer unit 14 is also preferably provided with at least one bubble level 46 useful for horizontally orienting the pointer unit 14, whether the pointer unit is attached to or detached from the shaft 16.

Figure 3:
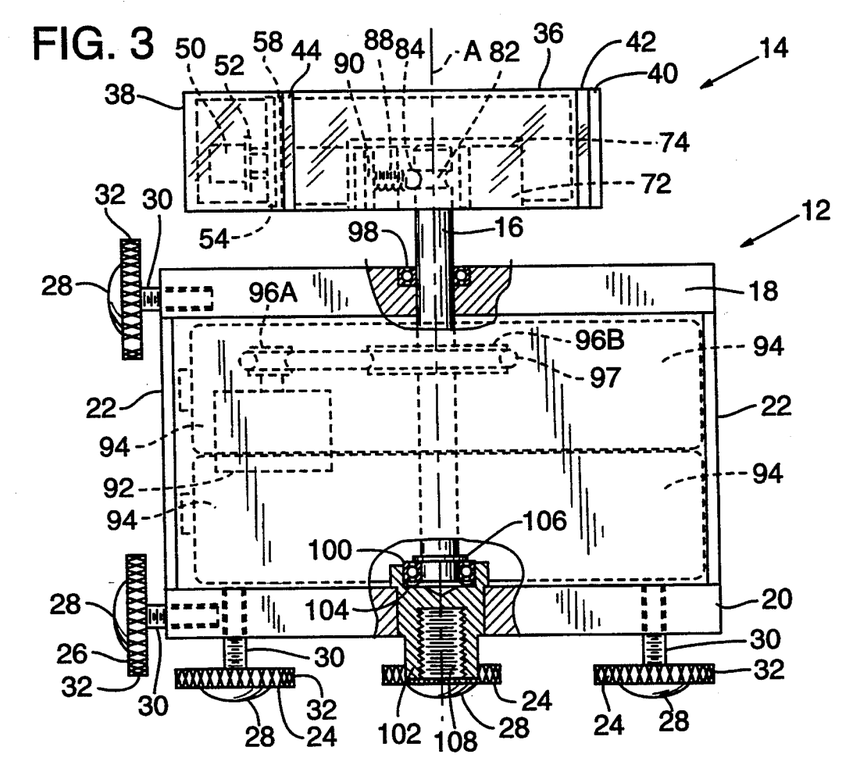
FIG. 3 is an elevational view of the FIG.−1 embodiment, showing cutaway details of shaft bearings and other features.

Referring to FIGS. 2 and 3, the pointer unit 14 also comprises a receptacle 72 adapted to mount on the underside of the pointer body 36 so as to extend into the pointer body 36. A gasket 74 is interposed between the receptacle 72 and the pointer body 36. The receptacle 72 and gasket 74 are mounted to the pointer body 36 via screws 76. The gasket 74 is preferably softly elastomeric to facilitate differential tightening of the screws 76, thereby providing a means for adjusting the precisely perpendicular orientation of the pointer unit 14 relative to the axis A. The receptacle 72 is provided with two parallel channels 78 each adapted to receive a corresponding precision-ground pin 80. When inserted into the channels 78, each of the pins 80 provides an unyielding line, precisely parallel to the axis A of the shaft 16, against which the shaft 16 is urged whenever the shaft 16 is inserted into the receptacle 72. As shown in FIG. 3, the shaft 16 is provided with an annular detent 82 which is placed so as to engage a ball 84. The ball 84 is suspended in an orifice 86 by a spring 88. The tension of the spring 88 is adjustable via a set screw 90. Thus, the ball 84, biased by the spring 88, urges the shaft 16 against the pins 80 whenever the shaft 16 is inserted into the receptacle 72.

The pointer unit 14 can also include an on-off switch (not shown) and "on" indicator (such as an LED; not shown) for independently turning the laser diode 50 on and off. (The switch and "on" indicator are not shown in FIG. 2 because they can be located at any convenient location on the pointer unit 14. However, the switch and "on" indicator are shown in FIG. 7.)

Referring to FIG. 3, the shaft 16 is rotatably mounted to the base portion 12, the shaft being journaled in the top panel 18 and the bottom panel 20. The shaft 16 is rotated about the longitudinal axis A preferably via an electric motor 92 suitably mounted inside the base portion 12. The motor 92 is powered preferably by batteries 94 housed in an appropriate manner inside the base portion 12. The base portion 12 can also include a power switch, "on" indicator (such as an LED), and potentiometer, if desired for adjusting motor speed. (The switch, "on" indicator, and potentiometer are not shown because these components can be located at any convenient location on the base portion.)

The base portion 12 can include, if necessary, any conventional electronic circuitry (not shown) required to drive the motor 92 and to govern the motor speed.

The coupling between the motor 92 and the shaft 16 can be direct or can be via any other appropriate coupling such as pulleys 96A and 96B (interconnected by a drive belt 97), gears, or analogous means. Pulleys and belt are preferred couplings because they inherently provide better mechanical isolation of the shaft from vibration and other rotational inaccuracies that could be generated by or otherwise transmitted to the shaft from the motor 92.

The shaft 16 is journaled in the top and bottom panels 18, 20, respectively, preferably by concentric precision ball bearings 98, 100 (class 7 or better) that allow substantially no wobble of the shaft 16 during rotation about the axis A. The bearing 100 is preferably mounted in a threaded insert 102 affixed to the bottom panel 20. Beneath the bearing 100 is a wavy compression washer 104 serving to pre-load the bearing 100, thereby virtually eliminating any play in the bearing 100. A snap ring 106 is attached to the shaft 16 immediately adjacent the bearing 100. Distal to the bearing 100 in the insert 102 is a threaded orifice 108 useful for attaching the base portion 12 to a tripod or analogous support (not shown).

Use of precision bearings 98, 100 in a preloaded condition as shown ensures that rotation of the shaft 16 about its axis A is substantially free of any vibration or wobble. It has been found that a shaft mounted in such a manner, when coupled to the motor 92 by the belt 97 and pulleys 96A, 96B, rotates with a low amount of vibration and wobble adequate for use in most construction applications.

The base portion 12 can be provided with doors or other easily openable or removable covers (not shown)

to allow interior access for the purpose of changing batteries and the like.

The pointer unit 14 can be readily detached from the shaft 16 for use as a hand-held pointer or laser level. For such use, it will be appreciated that the pointer unit 14 need not have a shape as shown in FIG. 1. Other shapes are possible, including shapes that are more comfortable for holding in the hand whenever the pointer unit 14 is being used as a hand-held laser pointer.

According to another aspect of the present invention, the laser diode 50 can be made to move independently of the circuit board 54 or other first mounting member (i.e., move independently of the pointer body 36 in a periodic reciprocating manner) so as to enable the pointer unit 14 to produce any of a variety of lines and other geometric tracings of laser light on a surface without having to move the pointer unit 14 relative to the surface. Whereas such a feature can be useful when the pointer unit 14 is attached to the base portion 12 (as shown, e.g., in FIG. 1), this feature is particularly advantageous whenever the pointer unit 14 is being used separately as a laser level or hand-held laser pointer.

Figure 4A:
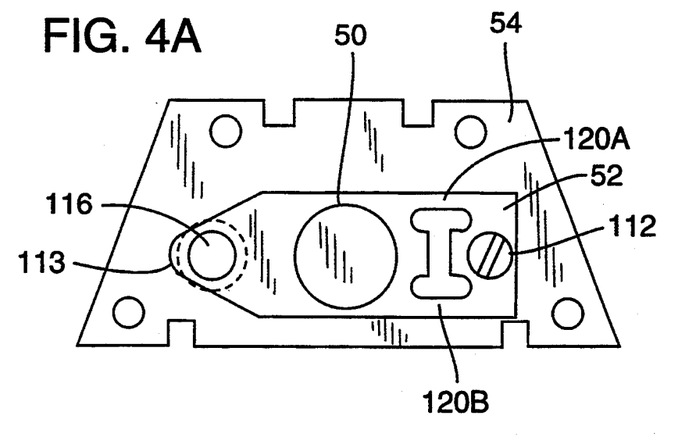
FIGS. 4A and 4B illustrate an embodiment of the manner in which a laser diode (or other compact source of coherent, collimated light) can be mounted to a printed circuit board in a pointer unit so as to enable the laser diode to be moved in a periodic reciprocating manner in a first dimension suitable for producing linear tracings of laser light on a surface even when the pointer unit is held stationary.
Figure 4B:
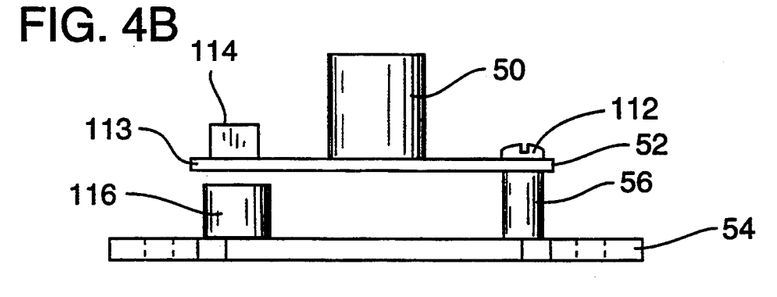

A first embodiment of how the laser diode 50 can be made to move independently of the pointer unit is shown in FIG. 4, in which are depicted the printed circuit board 54 (serving as a first mounting member for the laser diode 50) and the sub-board 52 (serving as a second mounting member) mounted to the circuit board 54 via the standoff 56 and screw 112 threaded into the standoff. The laser diode 50 is affixed to the sub-board 52 so as to move along with the sub-board whenever the sub-board 52 is caused to move relative to the circuit board 54. Also affixed to a free end 113 of the sub-board 52 is a ferromagnetic mass 114 such as a mass of iron or a permanent magnet. Beneath the ferromagnetic mass 114 on the circuit board 54 is mounted an electromagnetic coil 116, powered by conventional circuitry provided on the printed circuit board 54 or other convenient location in the pointer unit. The particular sub-board 52 shown in FIG. 4 is springably flexible and defines a void 118 therein leaving bridging portions 120A, 120B, which serve as a biased hinge. Energization of the coil 116 causes the ferromagnetic mass 114 on the end 113 of the sub-board 52 to be attracted to and move toward the coil 116, thereby causing the board 52 to flex at the bridging portions 120A, 120B. De-energization of the coil 116 allows the end 113 to return to its starting position under the influence of the inherent bias of the sub-board 52. Rapid energization and de-energization of the coil 116, such as at an appropriate resonant frequency, causes the end 113 of the sub-board (and thus the laser diode 50) to exhibit a correspondingly rapid periodic reciprocating motion in a single dimension relative to the circuit board 54. When a light beam produced by such a moving laser diode impinges upon a surface, a line is produced. The length of the line depends upon the amount of deflection experienced by the sub-board 52 when the ferromagnetic mass 114 is attracted to the coil 116, the frequency of the periodic reciprocating motion, and the distance from the laser diode 50 to the surface.

Figure 5:
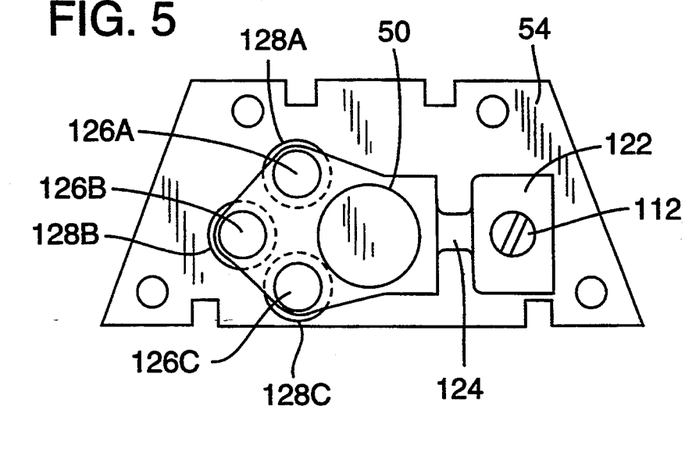
FIG. 5 is an alternative embodiment to that shown in FIG. 4, wherein the FIG.−5 embodiment permits the laser diode to be moved in a periodic reciprocating manner in two dimensions suitable for producing a variety of geometric tracings of light on a surface.

FIG. 5 shows an alternative embodiment to that shown in FIG. 4. In FIG. 5 can be seen the printed circuit board 54 to which is mounted a flexible sub-board 122 in the same manner as shown in FIG. 4. To the sub-board 122 is mounted the laser diode 50. The sub-board 122 has a narrow bridging portion 124 serving as a biased hinge. To the sub-board 122 are mounted three ferromagnetic masses 126A, 126B, 126C, beneath each of which is an electromagnetic coil 128A, 128B, 128C, respectively. Energization of coil 128B, but not coils 128A and 128C, moves the laser diode 50 in a first dimension. Energization of either of coils 128A or 128C (or of both coils in an alternating manner) moves the laser diode in a second dimension perpendicular to the first dimension. Selective energization of all three coils 128A, 128B, 128C relative to each other according to any of various energization profiles can cause the laser diode 50 to undergo a complex motion in two dimensions that can produce tracings of light on a surface corresponding to any of various respective geometric patterns, such as (but not limited to) triangular, circular, square, cross-shaped (+), arrow-shaped (→), and alphanumeric patterns.

Figure 6A:
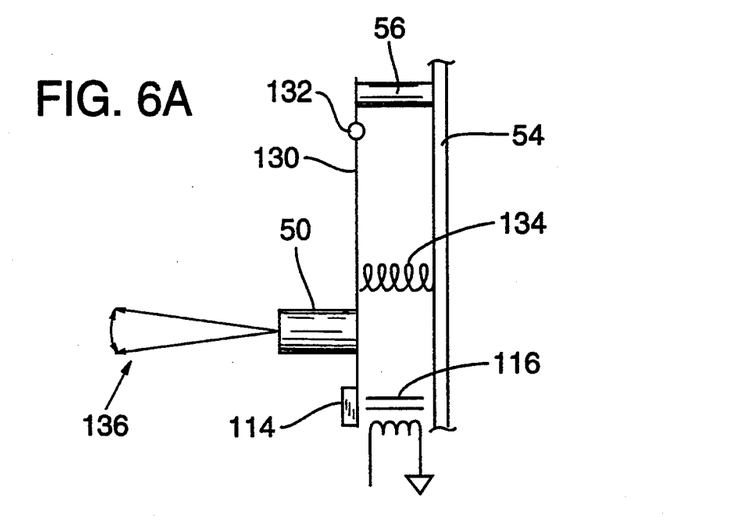
FIGS. 6A–6C each shows an alternative embodiment of means for mounting a laser diode in a pointer unit according to the present invention in a manner allowing the laser diode to be moved in a periodic reciprocating manner relative to the pointer unit in at least one dimension so as to enable the laser diode to produce various traced patterns of light on a surface.
Figure 6B:
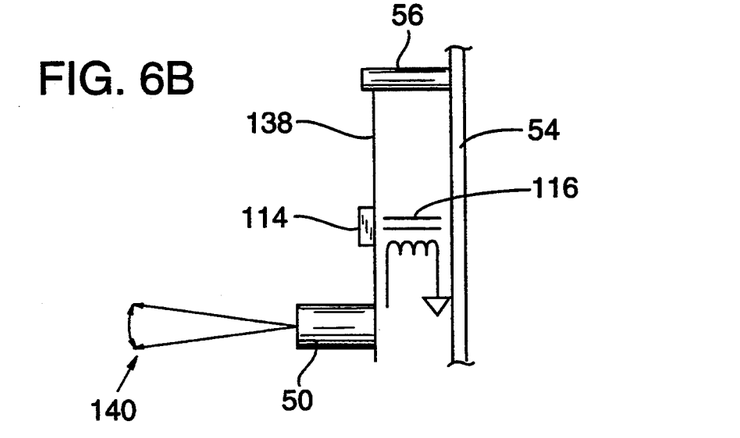
Figure 6C:
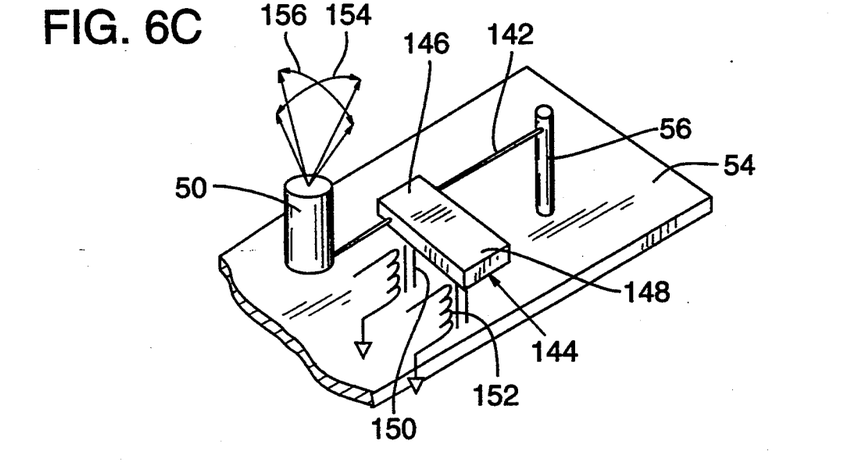

Other embodiments by which the laser diode can be mounted relative to coils and ferromagnetic masses are also possible, as representatively depicted in FIGS. 6A–6C. In FIG. 6A are shown the laser diode 50, the printed circuit board 54, the standoff 56, the ferromagnetic mass 114, and the electromagnetic coil 116 (shown as an electrical schematic symbol). The ferromagnetic mass 114 and the laser diode 50 are mounted to a rigid sub-board 130 provided with a non-biased hinge 132. The hinge 132 is mounted to the standoff 56. A separate bias 134 (such as a spring as shown) is provided between the sub-board 130 and the circuit board 54. Energization of the coil 116 urges the sub-board 130 to pivot about the hinge 132 toward the coil 116 against an opposing force exerted by the bias 134. De-energization of the coil causes the sub-board to pivot back to the "relaxed" position shown, as urged by the bias 134. Thus, a series of energizations and de-energizations of the coil 116 causes a periodic reciprocating motion in a first dimension (arrows 136) of the light beam produced by the laser diode 60. Such motion will produce a linear pattern of light on a surface.

Another embodiment is shown in FIG. 6B in which are depicted the laser diode 50, the circuit board 54, the standoff 56, the ferromagnetic mass 114, and the electromagnetic coil 116 (shown as an electrical schematic symbol). In FIG. 6B, the ferromagnetic mass 114 and laser diode 50 are mounted to a spring-board or spring-wire 138 (serving as a second mounting member for the laser diode 50) in cantilever fashion to the standoff 56. Thus, in FIG. 6B, the bias 134 shown in FIG. 6A is eliminated because the "bias" is an inherent feature of the spring-board or spring-wire 138. A periodic series of energizations and de-energizations of the coil 116 (mounted to the circuit board 54) causes a corresponding periodic reciprocating motion in a first dimension (arrows 140) of the light beam produced by the laser diode 50.

Yet another embodiment is shown in FIG. 6C in which are depicted the laser diode 50, the circuit board 54, and the standoff 56. The FIG. 6C embodiment is actually a variation of the FIG. 6B embodiment, wherein a spring-wire 142 is affixed in a cantilever fashion to the standoff 56, and the laser diode 50 is mounted on the free end of the spring-wire 142. A ferromagnetic mass 144 is mounted to the spring-wire 142 at about mid-length, the ferromagnetic mass 144 extending perpendicularly outward from the longitudinal dimension of the spring-wire 142. Thus, the ferromagnetic mass 144 has a first portion 146 through which the spring-wire 142 can be envisioned to pass and a second portion 148 on the free end of the ferromagnetic mass 144. A first electromagnetic coil 150 (shown as an electrical schematic symbol) is mounted to the circuit board 54 beneath the first portion 146 and a second electromagnetic coil 152 (shown as an electrical schematic symbol) is mounted to the circuit board 54 beneath the second portion 148.

Referring further to FIG. 6C, a periodic series of energizations and de-energizations of the coil 150 causes the laser diode to undergo a corresponding periodic reciprocating motion in a first dimension (arrow 154). A series of energizations and de-energizations of the coil 152 imparts a corresponding series of torques to the spring-wire 142, causing the laser diode to undergo a corresponding periodic reciprocating motion in a second dimension (arrow 156) perpendicular to the first dimension. (Any arrangement involving multiple coils imparting an ability of the laser diode to produce periodic reciprocating motions of the laser diode in two dimensions is termed a "quadrature" arrangement.) Energizations of the coils 150, 152 relative to each other can be either temporally distinct from one another or partially to completely coincident. In addition, energization pulses delivered to either or both coils can have any of various profiles such as triangular or sawtooth waveforms, sinusoidal waveforms, square waveforms, or any other waveform pattern, and combinations thereof. Thus, it will be immediately apparent that energizations and de-energizations of the coils 150, 152 can be according to any of various complex schemes producing corresponding periodic reciprocating motions of the laser diode sufficient to produce any of a large variety of geometric patterns of light tracings on a surface.

It is also possible to store and/or generate waveform patterns and pulse-train profiles, useful for energizing the coils, via a microprocessor or analogous electronic processor. Such information can be selectively recalled from the microprocessor memory for production of a desired traced-light pattern, including any of various geometric patterns and even alphanumeric print characters. Peripheral circuitry for recalling such information from a microprocessor would be conventional.

It will be immediately apparent to persons of ordinary skill in the art that other mechanisms can be used for imparting independent motions to a laser diode or other source of coherent collimated light. For example, according to general principles of machine design, periodic reciprocating motion can be generated by use of pistons, solenoids, and other linear actuators; rotary-to-linear motion converters; and analogous means. Use of coils and ferromagnetic masses, as described above, and, alternatively, any of various "voice-coil actuators" (e.g., as used for positioning computer disk-drive heads) are particularly advantageous for certain miniaturized embodiments of the present invention. Another particularly desirable mechanism for imparting periodic reciprocating motion to the light source, particularly in miniaturized embodiments, employs conventional piezoelectric-based actuators. Yet other means for imparting periodic reciprocating motions may be more suitable or desirable with larger-scale embodiments.

To permit user selection of various geometric tracings to be produced by a pointer unit equipped to produce tracings of light when stationary, an appropriate control such as a selector switch (not shown) can be provided at a convenient location on the outside of the pointer unit.

It will also be appreciated that imparting periodic reciprocating motion to the laser diode in at least one dimension as described above while simultaneously rotating the entire pointer unit 14 on the shaft 16 can produce even more complex tracings of light on a surface.

A representative circuit for powering the laser diode is shown schematically in FIG. 7, wherein the components are depicted using conventional symbols are thus self-explanatory.

For producing the beam of laser light, a laser diode is preferred because of its small size, durability, low power consumption, and relatively safe light intensity. However, it will be understood that other sources of coherent collimated light can also be used in the pointer unit, preferably light sources that can be provided in a self-powered pointer unit of manageable size.

The relatively low intensity of light produced by the laser diode in preferred embodiments of the present invention has certain safety benefits. First, the laser diode 50 is preferably of very low power consumption ($<2.5$ mW), which qualifies the laser diode as a "Class IIIB" laser device. Thus, the laser diode produces a light beam that is safer to view than beams produced by most other laser sources. Such low power also eliminates the need for the base portion to rotate the pointer unit at an impracticably rapid speed. Thus, according to the present invention as represented by, for example, the embodiment shown in FIG. 1, it is now possible to rotate the pointer unit 14 at low speeds (e.g., 60–120 rpm, or less) while still producing a swept light beam that is visible even in sunlight and that does not pose a substantial risk of eye damage to users and bystanders.

Operation of any of the various embodiments of the present invention is simple. For example, an embodiment as shown in FIG. 1 is simply placed on a suitable support surface by resting the apparatus 10 either on the "bottom" feet 24 (for rotation of the pointer unit 14 about the axis A oriented vertically) or on the "side" feet 26 (for rotation of the pointer unit 14 about the axis A oriented horizontally). (Alternatively, the apparatus 10 can be attached to a tripod or the like by threading a male fastener provided on the tripod into the threaded orifice 108 provided beneath the bottom panel 20 (see FIG. 3).) When the apparatus 10 is resting on the "bottom" feet 24, leveling of the apparatus can be performed by threading the feet 24 appropriately inwardly or outwardly while observing the bubble levels 34A, 34B. When the apparatus 10 is resting on the "side" feet 26, leveling can be performed by threading the feet 26 appropriately inwardly or outwardly while observing the bubble levels 34A, 34C. If necessary, the pointer unit 14 can be accurately oriented perpendicularly to the axis A by adjusting the screws 76 (FIG. 2), and the beam produced by the laser diode can be accurately oriented perpendicularly to the axis A (or parallel to the bottom of the pointer unit) by adjusting the screws 66 (FIG. 2). When mounted to the base portion 12, the pointer unit 14 can be used while stationary. Alternatively, the pointer unit 14 can be caused to rotate on the shaft 16 about the axis A by turning on the motor 92 in the base portion 12. Further alternatively, the pointer unit 14 can be detached from the shaft 16 for use separately as a laser level (using the bubble level 46 as a guide) or as a hand-held laser pointer.

While the invention has been described in connection with preferred and multiple alternative embodiments, it will be understood that the invention is not limited to those embodiments. On the contrary, the invention is intended to cover all alternatives, modifications, and equivalents as may be included within the scope of the invention as defined by the appended claims.

What is claimed is:

1. An apparatus for producing a beam of coherent light and for directing the beam to impinge on a surface so as to produce a tracing of light on said surface, the apparatus comprising:
   (a) a shaft having a fixed longitudinal axis and being rotatable about the axis;
   (b) a pointer unit comprising a light source adapted to produce a collimated beam of coherent light, the pointer unit being detachably mountable to the shaft such that, when the pointer unit is mounted to the shaft, the light beam produced by the light source is oriented substantially perpendicularly to the axis, the pointer unit further comprising a power source and an electronic circuit for powering the light source;
   (c) a motor operably coupled to the shaft, the motor being adapted for rotating the shaft about the axis, thereby rotating the pointer unit about the axis, whenever the pointer unit is attached to the shaft so as to enable the pointer unit to project a swept light beam that can be used to define a reference plane on a surface; and
   (d) a mounting member for supporting the light source, the mounting member being adapted to controllably move, in a periodic reciprocating manner in at least one dimension, the light source independently of any motion of the pointer unit so as to enable the pointer unit, when the mounting member is so moving the light source, to produce a tracing of light of a preselected geometric pattern on said surface.

2. An apparatus as recited in claim 1 wherein the pointer unit further comprises a housing, wherein the mounting member facilitates said controllable movement of the light source relative to the housing.

3. An apparatus as recited in claim 2 wherein the mounting member comprises a first mounting member attached to the housing, and a second mounting member attached to the first mounting member in a manner allowing motion of the second mounting member relative to the first mounting member, the light source being mounted to the second mounting member.

4. An apparatus as recited in claim 3 wherein the first mounting member comprises a printed circuit board and the second mounting member is a springably flexible sub-board, wherein a ferromagnetic mass is attached to the sub-board and an electromagnetic coil is attached to the printed circuit board so as to cause the ferromagnetic mass to be attracted to the coil and thereby cause the second mounting member to move toward the first mounting member whenever the coil is energized, and to move away from the first mounting member whenever the coil is deenergized.

5. An apparatus as recited in claim 2 wherein the pointer unit further comprises a receptacle mounted to the housing, the receptacle defining an orifice that is adapted to substantially coaxially receive an end of the shaft so as to facilitate mounting of the pointer unit to the end of the shaft, the orifice being flanked by at least two pins each having a longitudinal axis equally spaced from the axis of the shaft whenever the end of the shaft is inserted in the orifice, the pins serving to ensure, whenever the pointer unit is mounted to the end of the shaft, a precise perpendicular orientation of the pointer unit relative to the axis of the shaft.

6. An apparatus as recited in claim 5 wherein the end of the shaft is provided with an annular detent and the receptacle is provided with a biased ball adapted to engage the annular detent whenever the end of the shaft is inserted into the orifice, the biased ball serving to press the shaft against the pins in the orifice.

7. An apparatus as recited in claim 6 wherein the receptacle is attached to the housing of the pointer unit by a set of screws and the pointer unit further comprises an elastomeric gasket interposed between the receptacle and the housing, the gasket permitting the screws to be differentially tightened relative to one another so as to allow one to adjust the pointer unit to be oriented accurately perpendicular to the shaft axis whenever the pointer unit is mounted to the end of the shaft.

8. An apparatus as recited in claim 2 wherein the housing comprises a pointer body, a front cover adapted to be mounted to the pointer body and to which the light source is mounted, an elastomeric gasket adapted to be interposed between the front cover and the pointer body, and a set of screws for mounting the front cover to the pointer body, the gasket permitting the screws to be differentially tightened relative to one another so as to allow one to adjust the light beam produced by the light source to be oriented accurately perpendicular to the axis of the shaft whenever the pointer unit is mounted to the end of the shaft.

9. An apparatus for producing a beam of coherent light that impinges on a surface as a tracing of a preselected geometric pattern, the apparatus comprising:
   (a) a pointer unit comprising a light source adapted to produce a collimated beam of coherent light;
   (b) a power source and an electronic circuit for powering the light source, wherein the power source is electrically connected to the electronic circuit and the electronic circuit is electrically connected to the light source; and
   (c) means in the pointer unit for controllably moving the light source relative to the pointer unit in a periodic reciprocating manner in at least one dimension so as to enable the light source, when so moving, to produce a tracing of light of a preselected geometric pattern on said surface even when the pointer unit is stationary.

10. An apparatus as recited in claim 9 wherein the pointer unit comprises a housing adapted to contain the light source, the power source, the electronic circuit, and said means for moving the light source.

11. An apparatus as recited in claim 10 wherein the pointer unit is adapted to be mounted on an axis with the light source oriented so as to produce a beam of light directed substantially perpendicularly relative to the axis.

12. An apparatus as recited in claim 11 wherein the pointer unit is adapted to be rotated on the axis so as to cause the beam of light to be radially swept in a manner whereby the beam of light can define a reference plane as the light impinges on the surface.

13. An apparatus as recited in claim 10 wherein the light source is a laser diode.

14. An apparatus as recited in claim 13 wherein said means for controllably moving the light source relative to the pointer unit comprises first and second mounting members for supporting the laser diode, the first mounting member being rigid and not movable relative to the housing, the second mounting member having at least a portion thereof capable of undergoing motion relative to the first mounting member, and the laser diode being affixed to said portion of the second mounting member, said means further comprising means for moving the second mounting member relative to the first mounting member.

15. An apparatus as recited in claim 14 further comprising biasing means for biasing the motion of the second mounting member relative to the first mounting member.

16. An apparatus as recited in claim 15 wherein the second mounting member comprises a first portion affixed to the first mounting member and a second portion to which is mounted the laser diode, the second portion being movable relative to the first portion and the first mounting member, said biasing means comprising a springably flexible characteristic of the second mounting member allowing the second portion of the second mounting member to be flexed relative to the first portion.

17. An apparatus as recited in claim 16 wherein said means for moving the second mounting member relative to the first mounting member comprises an electromagnetic coil attached to the first mounting member and a ferromagnetic mass attached to the second mounting member so as to be operably engaged with, yet spaced apart from, the electromagnetic coil, the electromagnetic coil being adapted to be controllably energized so as to attract the ferromagnetic mass toward the coil, and de-energized so as to allow the ferromagnetic mass to recoil away from the coil in a manner facilitating periodic reciprocating motion of the second portion of the second mounting member relative to the first mounting member.

18. A laser pointer unit comprising:
   (a) a housing;
   (b) a first mounting member attached to the housing;
   (c) a second mounting member attached to the first mounting member in a manner allowing the second mounting member to be moved relative to the first mounting member independently of the housing;
   (d) a laser light-beam source attached to the second mounting member, the laser light-beam source being adapted to project a beam of light from the housing;
   (e) an electronic circuit, connected to the laser, for powering the laser light-beam source;
   (f) a power source, connected to the electronic circuit, for powering the laser light-beam source; and
   (g) means operable to move the second mounting member relative to the first mounting member in a periodic reciprocating manner in at least one dimension independently of the housing so as to enable the laser light-beam source, mounted on the second mounting member, to produce a tracing of laser light of a geometric pattern on a surface even when the housing is stationary.

19. A laser pointer unit as recited in claim 18 adapted to be manually held.

20. A laser pointer unit as recited in claim 19 wherein the electronic circuit and the power source are enclosed within the housing.

21. An apparatus for producing a beam of coherent light that impinges on a surface as a tracing of a preselected geometric pattern, the apparatus comprising:
   (a) a pointer unit comprising a light source adapted to produce a collimated beam of coherent light;
   (b) a power source and an electronic circuit for powering the light source, wherein the power source is electrically connected to the electronic circuit and the electronic circuit is electrically connected to the light source; and
   (c) a mounting member in the pointer unit for controllably moving the light source relative to the pointer unit in a periodic reciprocating manner in at least one dimension so as to enable the light source, when so moving, to produce a tracing of light of a preselected geometric pattern on said surface even when the pointer unit is stationary.

* * * * *